United States Patent
Tsukahara et al.

(10) Patent No.: US 11,214,301 B2
(45) Date of Patent: Jan. 4, 2022

(54) AUTOMATIC STEERING CONTROL APPARATUS AND AUTOMATIC STEERING CONTROL METHOD

(71) Applicant: Mitsubishi Electric Corporation, Chiyoda-ku (JP)

(72) Inventors: Yuhei Tsukahara, Tokyo (JP); Masaya Endo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 209 days.

(21) Appl. No.: 16/471,207

(22) PCT Filed: Nov. 13, 2017

(86) PCT No.: PCT/JP2017/040712
§ 371 (c)(1),
(2) Date: Jun. 19, 2019

(87) PCT Pub. No.: WO2018/135109
PCT Pub. Date: Jul. 26, 2018

(65) Prior Publication Data
US 2020/0086913 A1   Mar. 19, 2020

(30) Foreign Application Priority Data
Jan. 20, 2017 (JP) .............................. JP2017-008158

(51) Int. Cl.
*B62D 6/00* (2006.01)
*B60W 10/20* (2006.01)
*B60W 30/10* (2006.01)

(52) U.S. Cl.
CPC .............. *B62D 6/003* (2013.01); *B60W 10/20* (2013.01); *B60W 30/10* (2013.01);
(Continued)

(58) Field of Classification Search
CPC ....... B62D 6/003; B62D 6/001; B60W 10/20; B60W 30/10; B60W 2520/14; B60W 2710/207
See application file for complete search history.

(56) References Cited

U.S. PATENT DOCUMENTS

2016/0137195 A1* 5/2016 Takahashi .............. G08G 1/166
701/41
2016/0362102 A1* 12/2016 Honda ..................... B60K 6/52

FOREIGN PATENT DOCUMENTS

JP   2015-77908 A   4/2015

OTHER PUBLICATIONS

International Search Report dated Feb. 6, 2018 in PCT/JP2017/040712 filed on Nov. 13, 2017.

* cited by examiner

*Primary Examiner* — Tyler J Lee
*Assistant Examiner* — Yufeng Zhang
(74) *Attorney, Agent, or Firm* — Xsensus LLP (57) ABSTRACT

An automatic steering control apparatus includes a target-path acquisition unit that acquires a target path that is to be a traveling path of the vehicle, a target-rudder-angle acquisition unit that acquires a target rudder angle that is to be a rudder angle in the vehicle, on the basis of the target path, a sideslip-angle estimation unit that estimates a sideslip angle in the vehicle that is traveling at the target rudder angle, on the basis of the target rudder angle and a vehicle condition of the vehicle, and an automatic steering control unit. The automatic steering control unit performs at least one of stopping of automatic steering control and controlling of a steering-quantity regulation gain for regulating the target rudder angle, when the estimated sideslip angle is equal to or greater than a predetermined value.

6 Claims, 10 Drawing Sheets

(52) U.S. Cl.
CPC ... *B60W 2520/14* (2013.01); *B60W 2710/207* (2013.01); *B62D 6/001* (2013.01)

AUTOMATIC STEERING CONTROL APPARATUS AND AUTOMATIC STEERING CONTROL METHOD

TECHNICAL FIELD

The present invention relates to an automatic steering control apparatus and an automatic steering control method that are capable of automatic steering control where steering quantity in a vehicle is automatically controlled.

BACKGROUND ART

For the purpose of autonomous vehicle traveling, automatic steering control apparatuses conventionally calculate a target path for a vehicle, and automatically control the steering quantity in the vehicle so that the vehicle can follow the target path. Such an automatic steering control apparatus is described in, for instance, Patent Document 1.

The automatic steering control apparatus of Patent Document 1 defines a tangential direction at a point of the target path nearest to the origin point of a reference coordinate system as a target traveling direction for the vehicle, obtains a deviation of a sideslip angle on the basis of the target traveling direction and other things, and controls the vehicle steering quantity to prevent the deviation.

PRIOR ART DOCUMENT

Patent Document

Patent Document 1: Japanese Patent Application Laid-Open No. 2015-077908

SUMMARY

Problem to be Solved by the Invention

An excessively large sideslip angle in the vehicle saturates the cornering force of tires in the automatic steering control apparatus of Patent Document 1, thus degrading path followability. As a result, the vehicle can unfortunately behave unstably.

To solve this problem, it is an object of the present invention to provide a technique for avoiding vehicle traveling that degrades path followability.

Means to Solve the Problem

An automatic steering control apparatus according to the present invention is capable of automatic steering control where a steering quantity in a vehicle is automatically controlled. The automatic steering control apparatus includes the following: a target-path acquisition unit that acquires a target path that is to be a traveling path of the vehicle; a target-rudder-angle acquisition unit that acquires a target rudder angle that is to be a rudder angle in the vehicle, on the basis of the target path; a sideslip-angle estimation unit that estimates a sideslip angle in the vehicle that is traveling at the target rudder angle, on the basis of the target rudder angle and a vehicle condition of the vehicle; and an automatic steering control unit that performs at least one of stopping of the automatic steering control and controlling of a steering-quantity regulation gain for regulating the target rudder angle, when the sideslip angle, estimated by the sideslip-angle estimation unit, is equal to or greater than a predetermined value.

Effects of the Invention

The automatic steering control apparatus according to the present invention performs at least one of the stopping of the automatic steering control and the controlling of the steering-quantity regulation gain for regulating the target rudder angle, when the estimated sideslip angle is equal to or greater than the predetermined value. This avoids vehicle traveling that degrades path followability.

These and other objects, features, aspects and advantages of the Description will become more apparent from the following detailed description of the Description when taken in conjunction with the accompanying drawings.

DESCRIPTION OF EMBODIMENT(S)

First Embodiment

First, an automatic steering control apparatus will be described that relates to an automatic steering control apparatus according to a first embodiment of the present invention (hereinafter, referred to as the "related automatic steering control apparatus"). The automatic steering control apparatus according to the first embodiment will be described later on.

Figure 1:
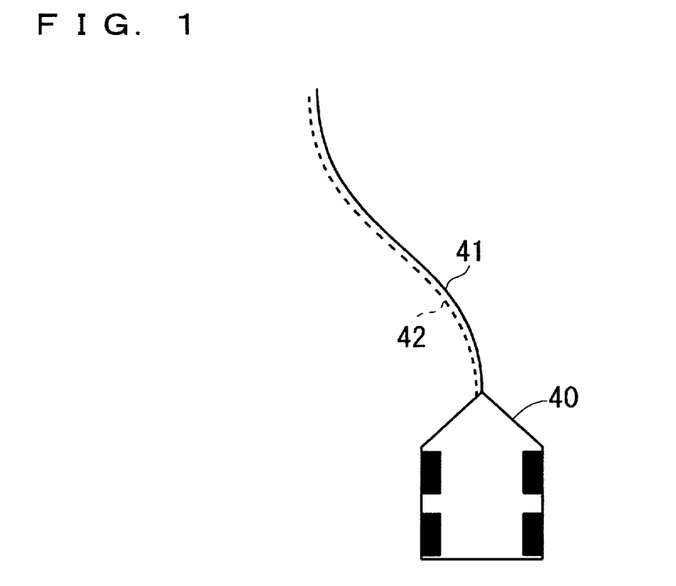
FIG. 1 is a diagram illustrating the relationship between a sideslip angle and a traveling path in a related automatic steering control apparatus.
Figure 2:
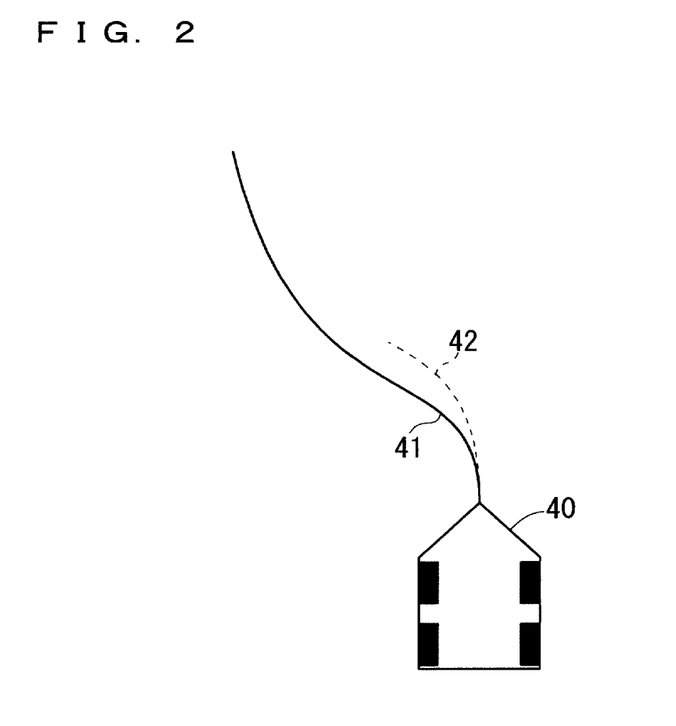
FIG. 2 is a diagram illustrating the relationship between the sideslip angle and the traveling path in the related automatic steering control apparatus.
Figure 3:
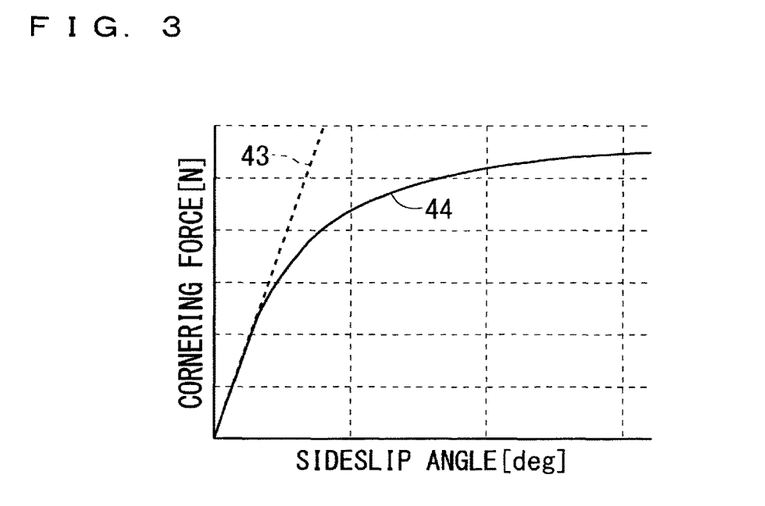
FIG. 3 is a graph showing the relationship between the sideslip angle and cornering force in the related automatic steering control apparatus.

FIG. 1 illustrates that a small sideslip angle in a traveling vehicle 40. FIG. 2 illustrates that a large sideslip angle in the traveling vehicle. FIG. 3 is a graph showing cornering force with respect to a sideslip angle.

The sideslip angle, herein, is an angle between the center plane of a tire and the traveling direction of the tire at the contact point of the tire. That is, the sideslip angle is an angle between the rolling direction of the tire in plan view and a direction in which the enter tires actually move. The rolling direction of the tire is a direction corresponding to a steering quantity. The traveling direction of the entire tires is a direction corresponding to a rudder angle. The sideslip angle may be an angle between the centerline of the vehicle body and a traveling direction at the center-of-gravity point of the vehicle body. The cornering force is a force in a lateral direction that is orthogonal to the traveling direction of the tire during vehicle rotation, and is generated by the grip of the tire.

Referring back to FIG. 1, the small sideslip angle brings a target path 41 that is to be a traveling path of the vehicle 40, into conformance with an actual traveling path 42 of the vehicle 40. Accordingly, the vehicle 40 behaves stably. As illustrated in FIG. 2, the large sideslip angle cannot allow the traveling path 42 to follow the target path 41. Accordingly, the vehicle 40 can unfortunately behave unstably.

This is because the related automatic steering control apparatus uses a model that does not reflect the saturation of the cornering force with respect to an increase in the sideslip angle. As illustrated in FIG. 3, which illustrates the relationship between the sideslip angle of the tire and the cornering force, practical apparatuses use a model 44 in which the cornering force is saturated when the sideslip angle increases to a certain extent. The related automatic steering control apparatus, on the other hand, uses a model 43 that does not reflect this saturation so that a calculation load is reduced in target-path calculation. As a result, the related automatic steering control apparatus is short of a reaction force that should intrinsically exist against sideslip occurrence. Accordingly, the vehicle can behave unstably.

The automatic steering control apparatus according to the first embodiment stops automatic steering control when the sideslip angle is equal to or greater than a predetermined value. The following describes the details.

Figure 4:
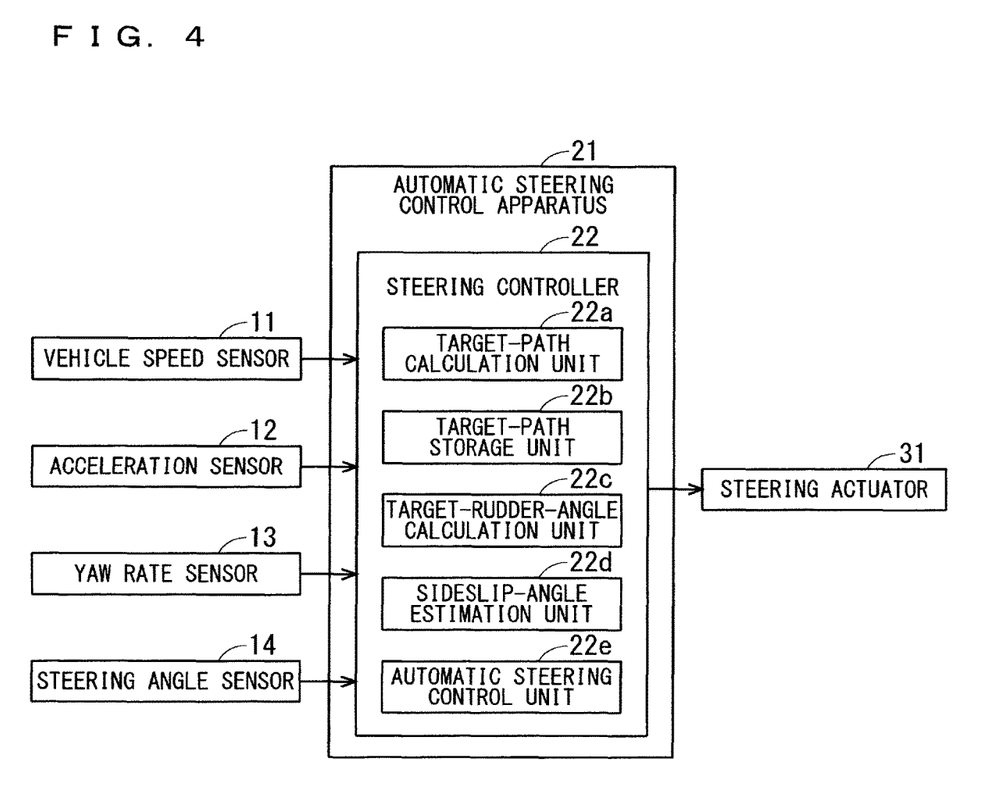
FIG. 4 is a block diagram illustrating a configuration of a vehicle system that includes an automatic steering control apparatus according to a first embodiment.

FIG. 4 is a block diagram schematically illustrating the configuration of the automatic steering control apparatus according to the first embodiment and of its peripheral apparatus. In other words, FIG. 4 is a block diagram schematically illustrating the configuration of a vehicle system that includes the automatic steering control apparatus according to the first embodiment. In the first embodiment, an automatic steering control apparatus 21 and its peripheral apparatus are electrically connected to each other and included in a vehicle. The peripheral apparatus includes a vehicle speed sensor 11, an acceleration sensor 12, a yaw rate sensor 13, a steering angle sensor 14, and a steering actuator 31.

Figure 5:
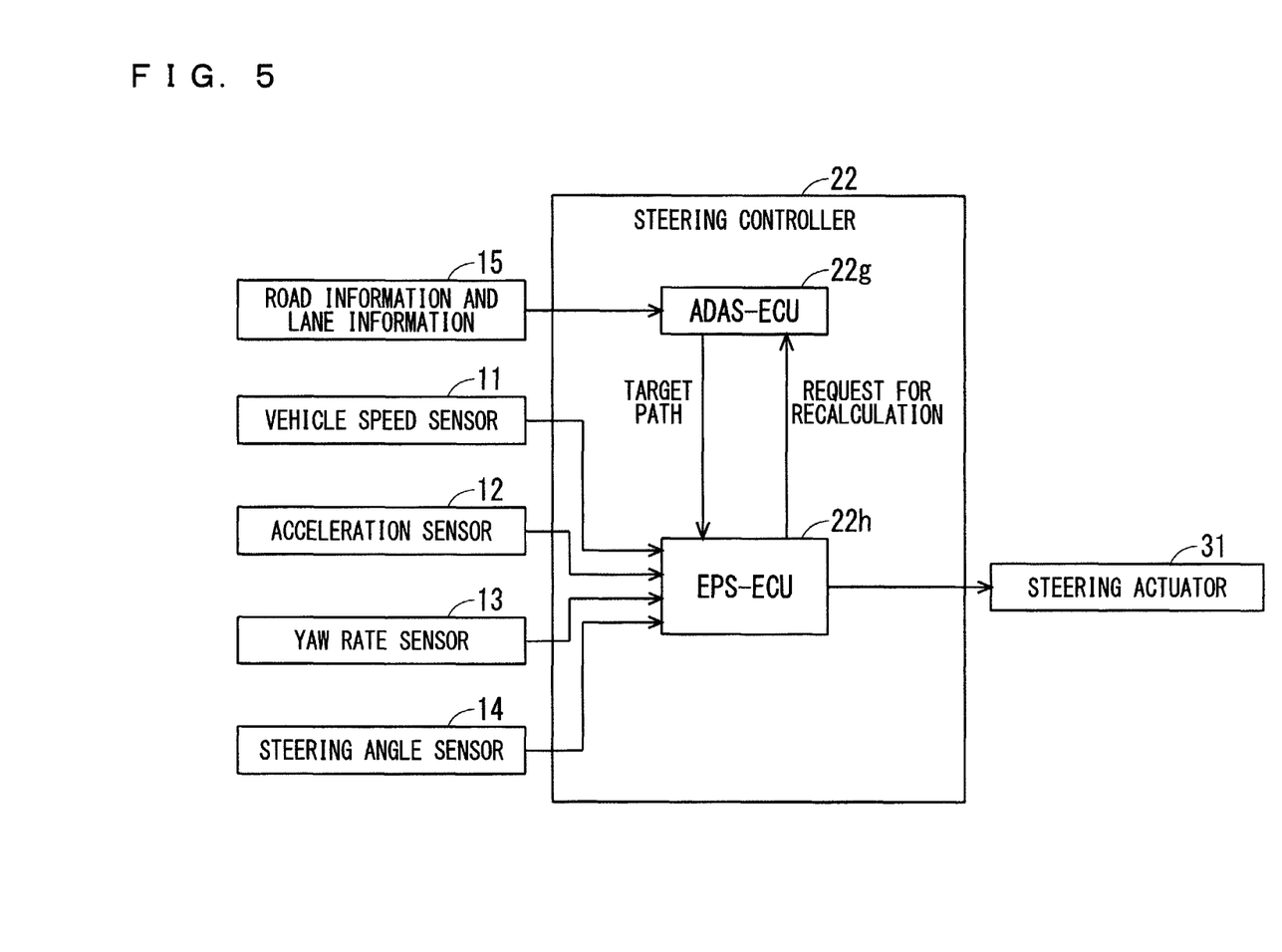
FIG. 5 is a diagram illustrating one example of the specific hardware configuration of the vehicle system including the automatic steering control apparatus according to the first embodiment.

FIG. 5 is a diagram illustrating one example of the specific hardware configuration of the vehicle system that includes the automatic steering control apparatus according to the first embodiment. FIG. 5 also schematically illustrates the communication between the automatic steering control apparatus according to the first embodiment and the peripheral apparatus. The automatic steering control apparatus according to the first embodiment is implemented using two kinds of electronic control unit (ECU). One is an advanced-driver-assistance-system (ADAS)-ECU 22g illustrated in FIG. 5, and the other is an electric-power-steering (EPS)-ECU 22h illustrated in FIG. 5. The ADAS-ECU 22g includes a target-path calculation unit 22a illustrated in FIG. 4. The EPS-ECU 22h includes a target-rudder-angle calculation unit 22b, a target-path storage unit 22c, a sideslip-angle estimation unit 22d, and an automatic steering controlling unit 22e.

The vehicle speed sensor 11 detects a vehicle speed, which is the speed of the vehicle, and outputs a signal in accordance with the vehicle speed to the automatic steering control apparatus 21. The acceleration sensor 12 detects an acceleration speed of the vehicle, and outputs a signal in accordance with the acceleration speed to the automatic steering control apparatus 21. The yaw rate sensor 13 detects a yaw rate, which is the rate of change in rotation angle in a vehicle cornering direction, and outputs a signal in accordance with the yaw rate to the automatic steering control apparatus 21. The steering angle sensor 14 detects a steering angle of a steering wheel on the basis of steering-wheel operation, and outputs a signal in accordance with the steering angle to the automatic steering control apparatus 21. The automatic steering control apparatus 21 receives vehicle specifications that are entered in advance. In this way, the automatic steering control apparatus 21 acquires vehicle conditions of the vehicle, the vehicle conditions including indexes, such as a vehicle speed, an acceleration speed, a yaw rate, a steering angle, and vehicle specifications.

The automatic steering control apparatus 21 includes a steering controller 22 capable of automatic steering control where steering quantity in the vehicle is automatically controlled. The steering controller 22 in FIG. 4 includes the target-path calculation unit 22a, (i.e., a target-path acquisition unit), the target-path storage unit 22b, the target-rudder-angle calculation unit 22c (i.e., a target-rudder-angle acquisition unit), the sideslip-angle estimation unit 22d, and the automatic steering control unit 22e.

Figure 6:
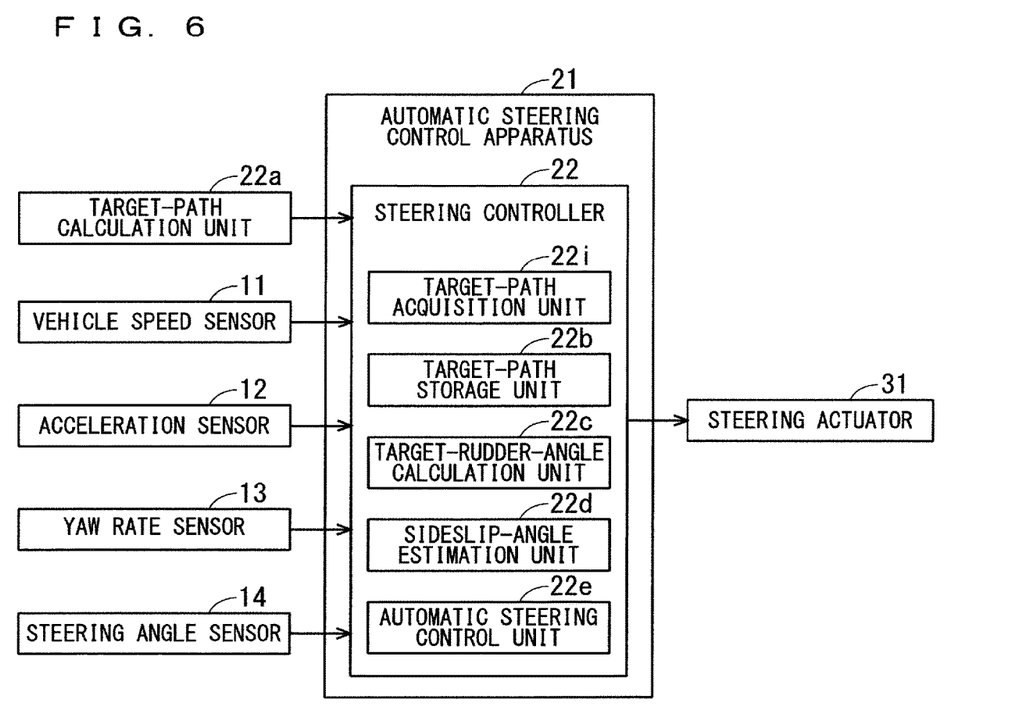
FIG. 6 is a block diagram illustrating another configuration of the vehicle system including the automatic steering control apparatus according to the first embodiment.

It is noted that the target-path calculation unit 22a (i.e., target-path acquisition unit), although, in the first embodiment, included in the automatic steering control apparatus 21, may be disposed outside the automatic steering control apparatus 21. FIG. 6 is a block diagram illustrating another configuration of the vehicle system including the automatic steering control apparatus according to the first embodiment. FIG. 6 illustrates that the target-path calculation unit 22a is disposed outside the automatic steering control apparatus 21. The automatic steering control apparatus 21 in FIG. 6 includes a target-path acquisition unit 22i, and acquires a target path from the external target-path calculation unit 22a. In this case, the automatic steering control apparatus 21 is formed of only the EPS-ECU 22h in FIG. 5. A second embodiment and the subsequent embodiments may be configured in a similar manner, in which the target-path calculation unit is disposed outside the automatic steering control apparatus.

The target-path calculation unit 22a, whenever necessary, calculates a target path on the basis of information 15 (e.g., road information and lane information) received from a global-positioning-system (GPS) apparatus, a camera, a millimeter wave radar, and other things, all of which are not shown herein. In this case, this information, received from the GPS apparatus, the camera, the millimeter wave radar, and other things can be referred to as base information for acquiring a target path. The target-path calculation unit 22a accumulates and stores the calculated target paths in the target-path storage unit 22b. When the target-path calculation unit 22a is disposed outside the automatic steering control apparatus 21, the target-path acquisition unit 22i acquires a target path, and accumulates and stores the target paths in the target-path storage unit 22b.

The target-rudder-angle calculation unit 22c calculates a target rudder angle on the basis of the latest target path stored in the target-path storage unit 22b. For instance, the target-rudder-angle calculation unit 22c calculates, as a target rudder angle, an angle formed between the tangential direction at a point of the target path corresponding to a vehicle position, and the fore-and-aft direction of the vehicle.

The sideslip-angle estimation unit 22d estimates a sideslip angle in the vehicle that is traveling at the target rudder angle, by substituting the target angle and the vehicle conditions into a vehicle model on the basis of the target rudder angle, calculated by the target-rudder-angle calculation unit 22c, and of the aforementioned vehicle conditions. One example of this estimation is described in Patent Document 1; this example may be applied to sideslip angle estimation in the first embodiment. It is noted that using a two-wheel model can simplify sideslip angle estimation.

The automatic steering control unit 22e calculates a steering quantity in the vehicle on the basis of the latest target path, stored in the target-path storage unit 22b. The automatic steering control unit 22e according to the first embodiment calculates a steering quantity in the vehicle on the basis of the target path based on the latest target path. The automatic steering control unit 22e automatically controls the steering actuator 31 on the basis of the calculated steering quantity. This enables the automatic steering control apparatus 21, by extension, the steering controller 22, to automatically control steering.

Here, the automatic steering control unit 22e in the first embodiment stops automatic steering control when the sideslip angle, estimated by the sideslip-angle estimation unit 22d, is equal to or greater than a first predetermined value. The following describes the details with reference to a flowchart.

Figure 7:
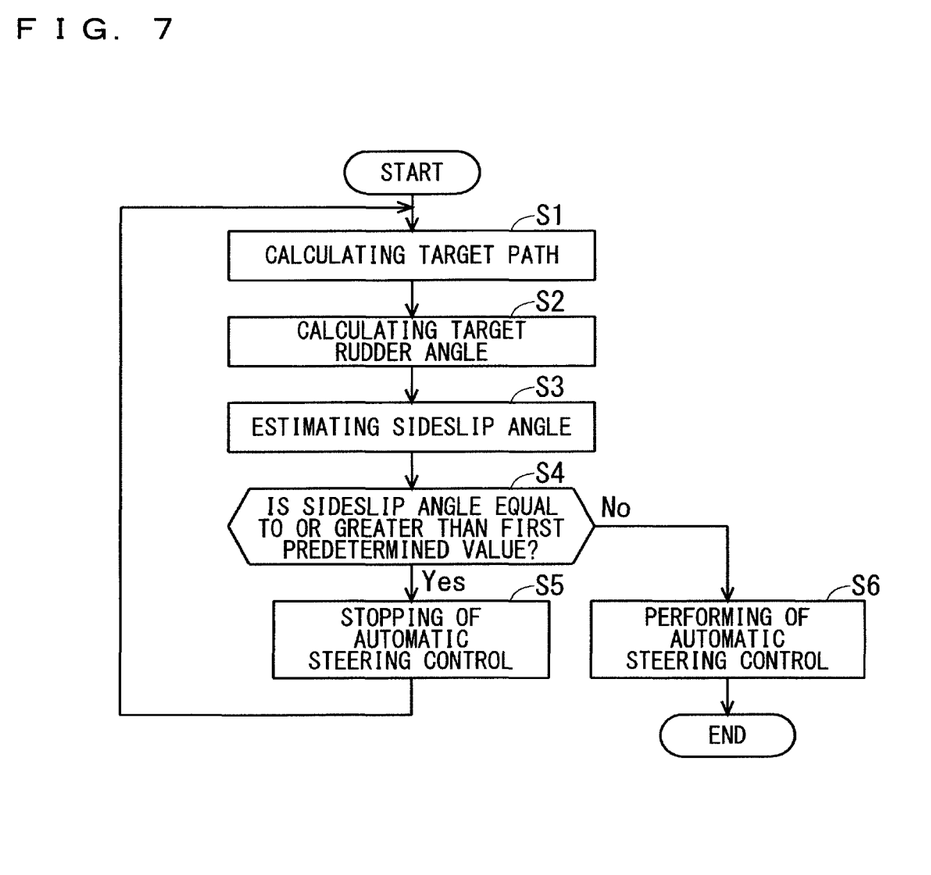
FIG. 7 is a flowchart showing the operation of the vehicle system including the automatic steering control apparatus according to the first embodiment.

FIG. 7 is a flowchart showing the operation and control of the vehicle system including the automatic steering control apparatus 21 according to the first embodiment. The operation indicated in the flowchart of FIG. 7 and the subsequent drawings starts under the control of a host apparatus or host system (not shown).

In step S1, the target-path calculation unit 22a calculates a target path on the basis of information received from the GPS apparatus, the camera, the millimeter wave radar, and other things.

In step S2, the target-rudder-angle calculation unit 22c calculates a target rudder angle on the basis of the target path, calculated in step S1.

In step S3, the sideslip-angle estimation unit 22d estimates a sideslip angle on the basis of the target rudder angle, calculated in step S2, and of the aforementioned vehicle conditions.

In step S4, the automatic steering control unit 22e determines whether the sideslip angle, estimated in step S3, is equal to or greater than the first predetermined value. An example of the first predetermined value used in this determination is the largest sideslip angle in a predetermined period. If the sideslip angle is determined to be equal to or greater than the first predetermined value, the process proceeds to step S5. If the sideslip angle is determined to be less than the first predetermined value, the process proceeds to step S6.

For the process from step S4 to step S5, the automatic steering control unit 22e stops automatic steering control; the process then returns to step S1 in which a target path calculation is recalculated. At this time, driver's manual driving, or change in the target path resulting from an update of the base information for the target path, for instance, can avoid vehicle traveling that degrades path followability. In order for the driver to be in time for manual driving, a sideslip angle at a location sufficiently distant from where the vehicle is traveling, is preferably calculated, or the driver preferably receives an earlier notification.

In other words, the driver preferably has sufficient time for manual driving before the vehicle arrives at a location for which a sideslip angle is calculated. For the process from step S5 back to step S1, the automatic steering control unit 22e outputs a signal indicating a request for target path recalculation to the target-path calculation unit 22a. Upon receiving the signal of the request for recalculation, the target-path calculation unit 22a determines that the last calculated target path produces a large sideslip angle, and thus recalculates a target path. At this time, the target-path calculation unit 22a desirably calculates a target path that produces a smaller sideslip angle than the last calculated target path.

For the process from step S4 to step S6, the automatic steering control unit 22e performs conventional automatic steering control based on the target path, by extension, on the target rudder angle; the process then ends. At this time, since path followability to a target point on the target path is determined to be kept high, the steering controller 22 is inactive under the control of the host apparatus or the host system until the operation in FIG. 7 with regard to the next target point starts from step S1.

Gist of First Embodiment

The automatic steering control apparatus 21 according to the first embodiment performs automatic steering control when the sideslip angle in the vehicle is less than the first predetermined value. The automatic steering control apparatus 21 stops the automatic steering control when the sideslip angle in the vehicle is equal to or greater than the first predetermined value. Such a configuration avoids vehicle traveling that degrades path followability, when a sideslip having an angle equal to or greater than a predetermined value occurs in the vehicle.

Second Embodiment

Figure 8:
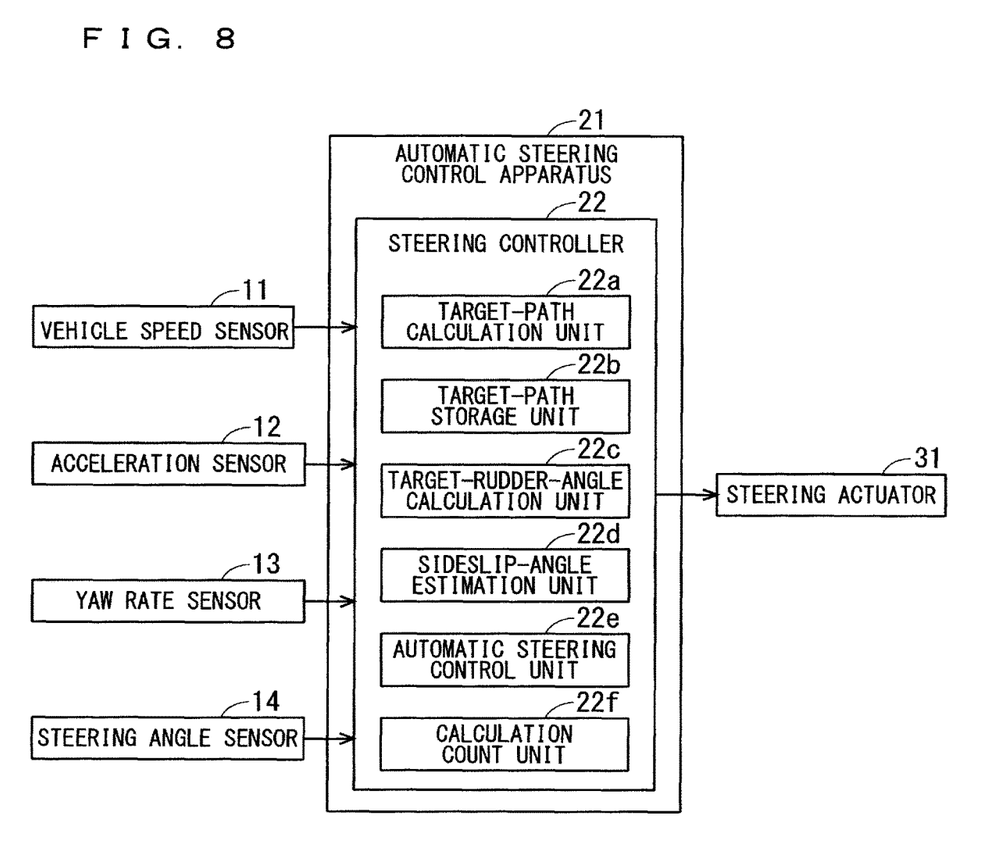
FIG. 8 is a block diagram illustrating a configuration of a vehicle system that includes an automatic steering control apparatus according to a second embodiment.

FIG. 8 is a block diagram schematically illustrating the configuration of an automatic steering control apparatus according to the second embodiment of the present invention and of its peripheral apparatus. In other words, FIG. 6 is a block diagram schematically illustrating the configuration of a vehicle system including the automatic steering control apparatus according to the second embodiment. Identical or like components between the first and second embodiments are denoted by the same reference signs. Mainly described herein are different components between the embodiments.

The target-path calculation unit 22a according to the second embodiment repeatedly calculates the target path in a period during which the sideslip angle, estimated by the sideslip-angle estimation unit 22d, is equal to or greater than the first predetermined value. In response to an update of the base information for target path calculation, the target-path calculation unit 22*a* calculates the target path on the basis of the information. The details will be described later on.

Here, the automatic steering control apparatus 21 in FIG. 8 includes a calculation count unit 22*f* (i.e., a count unit) in addition to the components of the automatic steering control apparatus 21 (c.f, FIG. 4) described in the first embodiment. The calculation count unit 22*f* counts the number of times of calculation at which the target-path calculation unit 22*a* calculates the target path. The calculation count unit 22*f* is included in, for instance, the EPS-ECU 22*h* in FIG. 5.

The automatic steering control unit 22*e* according to the second embodiment selectively performs stopping of automatic steering control and controlling of a steering-quantity regulation gain on the basis of the number of times of calculation, counted by the calculation count unit 22*f*. The steering-quantity regulation gain herein is a gain for regulating the target rudder angle to prevent a sideslip in the vehicle.

Figure 9:
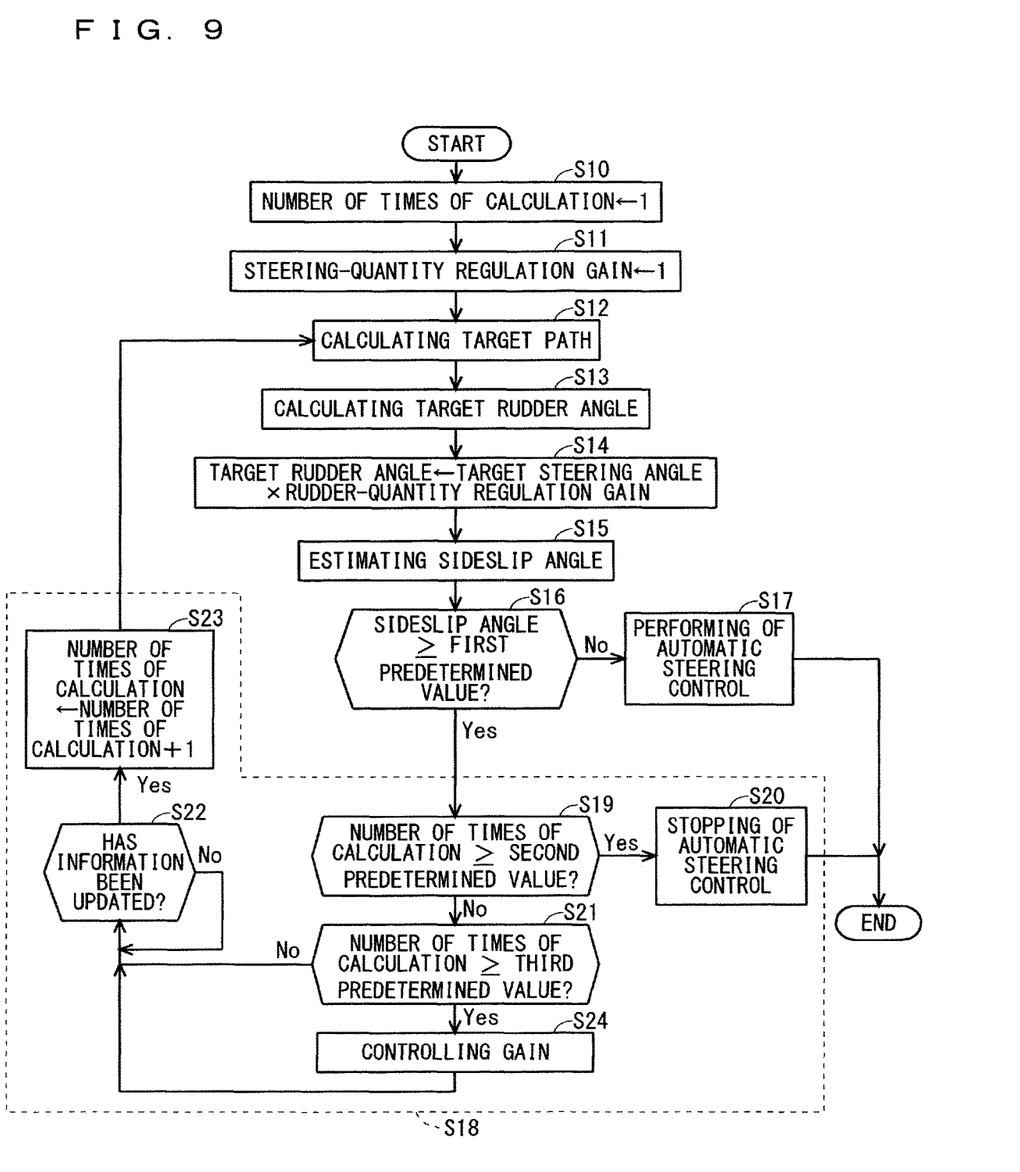
FIG. 9 is a flowchart showing the operation of the vehicle system including the automatic steering control apparatus according to the second embodiment.

FIG. 9 is a flowchart showing the operation and control of the vehicle system including the automatic steering control apparatus 21 according to the second embodiment. In the operation in FIG. 9, steps S10, S11, S14, S18, and other process steps are added to the operation described in the first embodiment (c.f, FIG. 7).

In step S10, the calculation count unit 22*f* sets the number of times of calculation at one.

In step S11, the automatic steering control unit 22*e* sets the steering-quantity regulation gain at one.

In step S12, which is similar to step S1 in FIG. 7, the target-path calculation unit 22*a* calculates a target path on the basis of the base information for target path calculation, received from the GPS apparatus, the camera, the millimeter wave radar, and other things.

In step S13, which is similar to step S2 in FIG. 7, the target-rudder-angle calculation unit 22*c* calculates a target rudder angle on the basis of the target path, calculated in step S12.

In step S14, the automatic steering control unit 22*e* multiplies the target rudder angle, calculated in step S13, by a steering-quantity regulation gain. This regulates the target rudder angle so as to prevent a sideslip in the vehicle.

In step S15, which is similar to step S3 in FIG. 7, the sideslip-angle estimation unit 22*d* estimates a sideslip angle on the basis of the target rudder angle regulated in step S14, and of the aforementioned vehicle conditions.

In step S16, which is similar to step S4 in FIG. 7, the automatic steering control unit 22*e* determines whether the sideslip angle, estimated in step S15, is equal to or greater than the first predetermined value. In the second embodiment as well, the first predetermined value used in this determination is the largest slide-slip angle in a predetermined period. If the sideslip angle is determined to be equal to or greater than the first predetermined value, the process proceeds to step S18. If the sideslip angle is determined to be less than the first predetermined value, the process proceeds to step S17.

For the process from step S16 to step S17, the automatic steering control unit 22*e* performs conventional automatic steering control based on the target path, in a manner similar to step S6 in FIG. 7; the process then ends.

For the process from step S16 to step S18, the stopping of the automatic steering control and the controlling of the steering-quantity regulation gain are selectively performed based on the number of times of calculation. The following describes steps S19 to S24 included in step S18.

In step S19, the automatic steering control unit 22*e* determines whether the number of times of calculation is equal to or greater than a second predetermined value. If the number of times of calculation is determined to be equal to or greater than the second predetermined value, the process proceeds to step S20. If the number of times of calculation is determined to be less than the second predetermined value, the process proceeds to step S21.

For the process from step S19 to step S20, the automatic steering control unit 22*e* stops the automatic steering control; the process then ends.

For the process from step S19 to step S21, the automatic steering control unit 22*e* determines whether the number of times of calculation is equal to or greater than a third predetermined value that is smaller than the second predetermined value. If the number of times of calculation is determined to be equal to or greater than the third predetermined value, the process proceeds to step S24. If the number of times of calculation is determined to be less than the third predetermined value, the process proceeds to step S22.

For the process from step S21 to step S22, the steering controller 22 determines whether the base information for target path calculation has been updated since step S12 was performed the last time. The automatic steering control unit 22*e* checks for an update of the information received by the target-path calculation unit 22*a*. The process step in step S22 can be implemented through this checking. If the information is determined to have been updated, the process proceeds to step S23. If the information is determined to have not been updated, step S22 is redone.

In step S23, the calculation count unit 22*f* increments the number of times of calculation; the process then returns to step S12. Accordingly, the calculation count unit 22*f* obtains the number of times of calculation, at which the target-path calculation unit 22*a* calculates the target path. When the process returns from step S23 to step S12, the automatic steering control unit 22*e* outputs a signal indicating a request for target path recalculation to the target-path calculation unit 22*a*. Upon receiving the signal of the request for recalculation, the target-path calculation unit 22*a* determines that the last calculated target path produces a large sideslip angle, and then recalculates a target path. At this time, the target-path calculation unit 22*a* desirably calculates a target path that produces a smaller sideslip angle than the last calculated target path.

For the process from step S21 to step S24, the automatic steering control unit 22*e* controls the steering-quantity regulation gain so that the sideslip angle is less than the first predetermined value; the process then proceeds to step S22. A possible example of such controlling of the steering-quantity regulation gain controlling in which the steering-quantity regulation gain decreases every time step S24 is performed.

The following gives a short summary of the aforementioned operation. The automatic steering control apparatus 21 according to the second embodiment performs processing (i) to (iii) indicated below.

(i) In a relationship of the number of times of calculation≥the second predetermined value (referred to as case 1), the automatic steering control is stopped in step S20. In case 1, sideslips continuously occur at high frequency.

(ii) In a relationship of the second predetermined value>the number of times of calculation≥the third predetermined value (referred to as case 2), the target path is recalculated in step S12 after the steering-quantity regulation gain is regulated in step S24. In case 2, sideslips continuously occur at middle frequency.

(iii) In a relationship of the third predetermined value>the number of times of calculation (referred to as case 3), the target path is recalculated in step S12 without the steering-quantity regulation gain regulated, that is, with the steering-quantity regulation gain maintained at one. In case 3, sideslips continuously occur at low frequency. That is, case 3 refers to the occurrence of an instantaneous sideslip, and the non-occurrence of a sideslip large enough to stop the automatic steering control.

Referring to the operation in FIG. 9, it is noted that the process may return to step S14 after the steering-quantity regulation gain is regulated in step S24, without returning to step S12 via step S22. That is, the process may be configured in such a manner that the target path is not recalculated after the steering-quantity regulation gain is regulated.

Gist of Second Embodiment

As such, the automatic steering control apparatus 21 according to the second embodiment achieves the following three effects. The first one, which is similar to that in first embodiment: the automatic steering control is stopped when a sideslip having an angle equal to or greater than the first predetermined value, and when the number of times at which the target path is calculated, is equal to or greater than the second predetermined value (i.e., when sideslips continuously occur at high frequency). The second one: the automatic steering control continues even under the occurrence of an instantaneous sideslip, because the process returns to the process step of target-path calculation when the number of times of calculation is less than the third predetermined value. The third one: the automatic steering control continues with a sideslip being avoided by controlling the steering-quantity regulation gain, when the number of times of calculation is less than the second predetermined value and equal to or greater than the third predetermined value (i.e., an instance where a sideslip occurs, but no sideslips continuously occurs that involves the stopping of the automatic steering control).

Here, let the target path be calculated before an update of the GPS and camera information for target-path calculation, without step S22 in FIG. 9 being performed. Accordingly, the process steps from steps S12 to S21 are uselessly repeated, because the target path calculated in step S12 the last time is the same as the target path calculated in step S12 the next time. The target-path calculation unit 22a according to the second embodiment, in contrast, does not return directly to the process step in step S12 to calculate the target path. Rather, the target-path calculation unit 22a performs the process step in step S22, thus calculating the target path on the basis of the base information for target-path calculation, in response to an update of the base information. Consequently, in the next calculation cycle, the target-path calculation unit 22a calculates a target path that reflects the presence or absence of a request for target-path calculation. This prevents a useless repetition of the process steps from step S12 to S21.

Third Embodiment

A block diagram schematically illustrating an automatic steering control apparatus according to a third embodiment of the present invention and its peripheral apparatus is similar to that illustrating the automatic steering control apparatus 21 descried in the second embodiment (c.f, FIG. 8). Identical or like components between the second and third embodiments are denoted by the same reference signs. Mainly described herein are different components between the embodiments.

Figure 10:
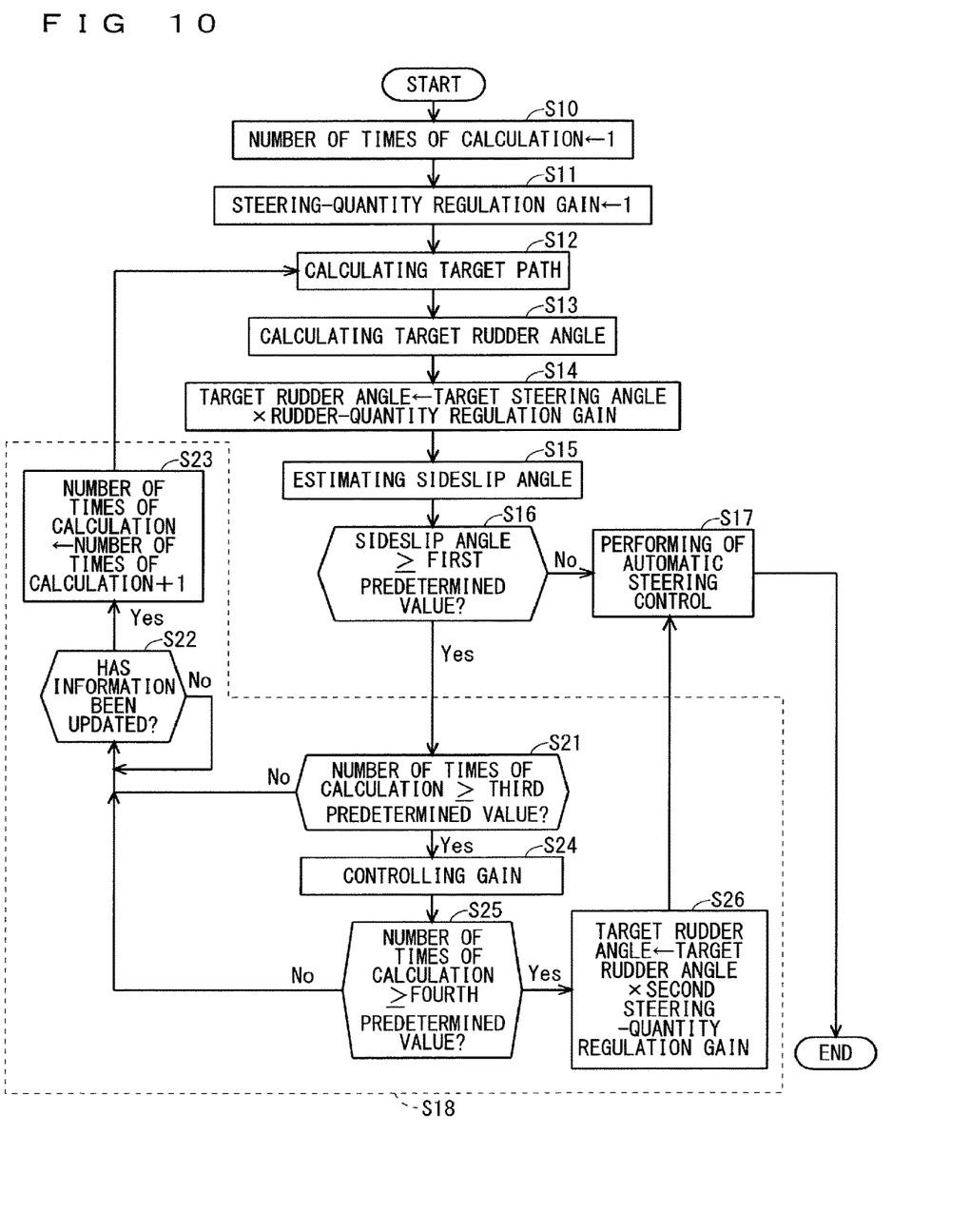
FIG. 10 is a flowchart showing the operation of a vehicle system including an automatic steering control apparatus according to a third embodiment.

FIG. 10 is a flowchart showing the operation and control of a vehicle system that includes the automatic steering control apparatus 21 according to the third embodiment. In the operation in FIG. 10, steps S19 and S20 are removed from the operation in the second embodiment (c.f, FIG. 9), and steps S25 and S26 are added to the operation in the second embodiment (c.f, FIG. 9).

Here, the automatic steering control apparatus 21 according to the third embodiment uses two kinds of steering-quantity regulation gain. One is a steering-quantity regulation gain used in step S14, and the other is a steering-quantity regulation gain used in step S26. Hereinafter, the former is referred to as a first steering-quantity regulation gain, and the latter is referred to as a second steering-quantity regulation gain.

Steps S10 to S13 are performing process steps similar to those in steps S10 to S13 in the second embodiment (c.f, FIG. 9). In step S14, the automatic steering control unit 22e multiplies the target rudder angle, calculated in step S13, by the first steering-quantity regulation gain, thus regulating the target rudder angle.

Then, steps S15 to S17 are performing process steps similar to those in steps S15 to S17 in the second embodiment (c.f, FIG. 9). However, if, in step S16, the sideslip angle is determined to be equal to or greater than the first predetermined value, the process proceeds to step S21.

Steps S21 to S24 are performing process steps similar to those in steps S21 to S24 in the second embodiment (c.f, FIG. 9). In step S25 after step S24, the automatic steering control unit 22e determines whether the number of times of calculation is equal to or greater than a fourth predetermined value that is greater than the third predetermined value. If the number of times of calculation is determined to be equal to or greater than the fourth predetermined value, the process proceeds to step S26. If the number of times of calculation is less than the fourth predetermined value, the process proceeds to step S22.

In step S26, the automatic steering control unit 22e multiplies the current target rudder angle by the second steering-quantity regulation gain, thus regulating the target rudder angle. Then, in step S17, the automatic steering control unit 22e performs conventional automatic steering control based on the target rudder angle; the process then ends.

In the regulation processing in step S26, the target rudder angle is forcedly regulated to be small, under the expectation that a slip still occurs even if the sideslip angle is estimated after the regulation of the target rudder angle using the steering-quantity regulation gain. Accordingly, the second steering-quantity regulation gain in step S26 may be a predetermined static value, whereas the first steering-quantity regulation gain in step S14 is a dynamic value.

In step S26, the target rudder angle is forcedly determined without the estimation of the sideslip angle (c.f, step S15). Hence, for safety, the second steering-quantity regulation gain is preferably determined in such a manner that the target rudder angle after regulation is gentler than that in the first steering-quantity regulation gain. Accordingly, in the third embodiment, the second steering-quantity regulation gain when the number of times of calculation is equal to or greater than the fourth predetermined value, is smaller than the first steering-quantity regulation gain when the number of times of calculation is less than fourth predetermined value.

<Gist of Third Embodiment>

As such, in the automatic steering control apparatus 21 according to the third embodiment, the second steering-quantity regulation gain when the number of times of calculation is equal to or greater than the fourth predetermined value, is smaller than the first steering-quantity regulation gain when the number of times of calculation is less than the fourth predetermined value. Such a configuration prevents a sideslip in the vehicle without uselessly repeating the sideslip angle estimation (c.f, step S15).

First Modification

Figure 11:
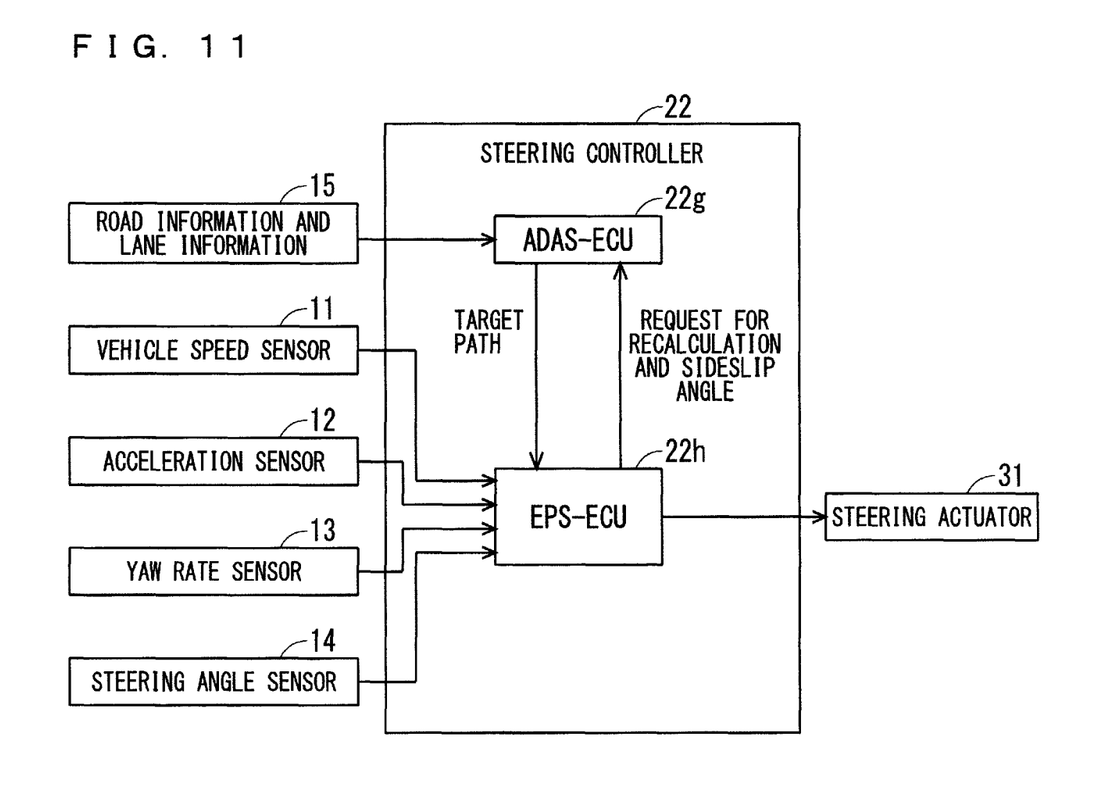
FIG. 11 is a diagram illustrating one example of the specific hardware configuration of a vehicle system included in an automatic steering control apparatus according to a modification.

FIG. 11 is a diagram schematically illustrating another example of the communication between the automatic steering control apparatus according to the first embodiment and its peripheral apparatus. In the configuration in FIG. 11, the EPS-ECU 22h sends, to the ADAS-ECU 22g, a signal indicating a request for recalculation, and a sideslip angle estimated by the sideslip-angle estimation unit 22d illustrated in FIG. 4. That is, in the configuration in FIG. 11 the EPS-ECU 22h outputs the signal indicating the request for recalculation, and the estimated sideslip angle when requesting the ADAS-ECU 22g to recalculate a target path. The ADAS-ECU 22g may reflect the received sideslip angle to target-path calculation. For instance, the ADAS-ECU 22g may regulate the quantity of change in a target path to be recalculated from the last calculated target path, in accordance with the estimated sideslip angle.

Second Modification

The target-path calculation unit 22a, the target-rudder-angle calculation unit 22c, the sideslip-angle estimation unit 22d, the automatic steering control unit 22e, and the calculation count unit 22f, all of which are included in the automatic steering control apparatus 21, are hereinafter referred to as "the target-path calculation unit 22a and other components". The target-path calculation unit 22a and other components are implemented by a processing circuit 81 illustrated in FIG. 12. That is, the processing circuit 81 includes the following: a target-path acquisition unit that acquires a target path; a target-rudder-angle acquisition unit that acquires a target rudder angle on the basis of the target path; a sideslip-angle estimation unit that estimates a sideslip angle in a vehicle that is traveling at the target rudder angle, on the basis of the target rudder angle and a vehicle condition of the vehicle; and an automatic steering control unit that performs at least one of stopping of automatic steering control and controlling of a steering-quantity regulation gain for regulating the target rudder angle, when the sideslip angle, estimated by the sideslip-angle estimation unit, is equal to or greater than a predetermined value. The processing circuit 81 may consist of dedicated hardware or a processor to execute a program stored in a memory. Examples of the processor include a central processing unit, a processing unit, a calculator, a microprocessor, a microcomputer, and a digital signal processor (DSP).

Figure 12:
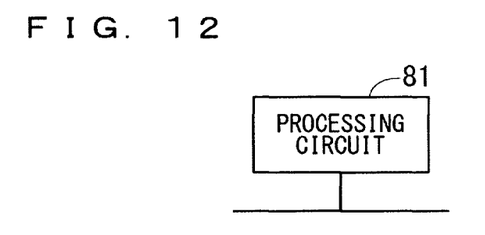
FIG. 12 is a block diagram illustrating a hardware configuration of the automatic steering control apparatus according to the modification.

Examples of the processing circuit 81, when consisting of dedicated hardware, include a single circuit, a complex circuit, a programmed processor, a parallel-programmed processor, an application-specific integrated circuit (ASIC), a field-programmable gate array (FPGA), and a combination thereof. The target-path calculation unit 22a and other components may individually function through distributed circuits, or may, all together, function through a single processing circuit.

Figure 13:
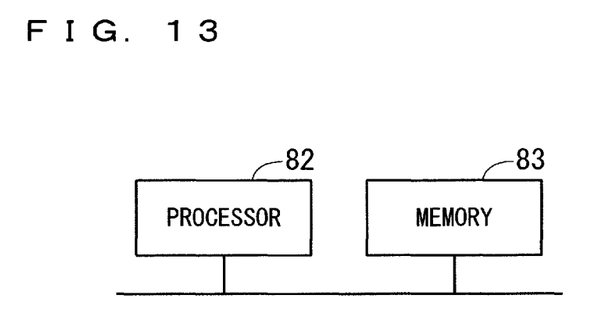
FIG. 13 is a block diagram illustrating a hardware configuration of the automatic steering control apparatus according to the modification.

When the processing circuit 81 consists of a processor, the target-path calculation unit 22a and other components function in combination with software and other things. Examples of the software and other things include software, firmware, and a combination of software and firmware. The software and other things are written as a program and stored in a memory 83. FIG. 13 shows a processor 82 serving as the processing circuit 81. The processor 82 reads and executes the program stored in the memory 83, thus implementing the function of each component. That is, the automatic steering control apparatus 21 includes the memory 83 to store a program, which, when executed by the processing circuit 81, performs the following steps: acquiring a target path, acquiring a target rudder angle on the basis of the target path; estimating a sideslip angle in a vehicle that is traveling at the target rudder angle, on the basis of the target rudder angle and a vehicle condition of the vehicle; and performing at least one of stopping of automatic steering control and controlling of a steering-quantity regulation gain for regulating the target rudder angle, when the estimated sideslip angle is equal to or greater than a predetermined value. In other words, this program causes a computer to execute the procedure or method of the target-path calculation unit 22a and other components. Here, examples of the memory 83 include a non-volatile or volatile semiconductor memory (e.g., a random access memory or RAM for short, a read only memory or ROM for short, a flash memory, an erasable programmable read only memory or EPROM for short, or an electrically erasable programmable read only memory or EEPROM for short), a hard disk drive (HDD), a magnetic disc, a flexible disc, an optical disc, a compact disc, a mini disc, a digital versatile disc (DVD), and drivers thereof. Alternatively, the memory 83 may be any kind of storing medium that will be used in the future.

The foregoing has described that each of the target-path calculation unit 22a and other components functions through one of hardware, and software and other things. Part of the target-path calculation unit 22a and other components may be implemented by dedicated hardware, and different part of them may be implemented by software and other things. For instance, the function of the target-path calculation unit 22a can be implemented by a processing circuit serving as dedicated hardware, such as a receiver. In addition, the functions of the other components can be implemented by the processing circuit 81 serving as the processor 82 that reads and executes the program stored in the memory 83.

As described above, the processing circuit 81 can implement the aforementioned individual functions using hardware, or software and other things, or using a combination thereof.

The automatic steering control apparatus in the foregoing description can be also included in an automatic steering control system that is established as a system in combination, as necessary, with a navigation device, such as a portable navigation device (PND), with a communication terminal including a mobile terminal, such as a mobile phone, a smart phone, or a tablet, with the functions of applications installed therein, and with a server. In this case, the individual functions or individual components of the aforementioned automatic steering control apparatus may be distributed in the individual devices constituting this system, or may be centralized in any of these devices.

In one example, the automatic steering control apparatus may include at least one of the vehicle speed sensor 11, the acceleration sensor 12, the yaw rate sensor 13, and the steering angle sensor 14, all of which are illustrated in FIG. 4. In another example, the server may have a navigation function, and the navigation device may only have a display function and a position detecting function.

It is noted that in the present invention, the individual embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 21 automatic steering control apparatus, 22a target-path calculation unit, 22c target-rudder-angle calculation unit, 22d sideslip-angle estimation unit, 22e automatic steering control unit, 22f calculation count unit.

The invention claimed is:

1. An automatic steering control apparatus capable of automatic steering control where a steering quantity in a vehicle is automatically controlled, the automatic steering control apparatus comprising:
　a target-path receiver configured to acquire a target path that is to be a traveling path of the vehicle;
　a target-rudder-angle receiver configured to acquire a target rudder angle that is to be a rudder angle in the vehicle, on the basis of the target path;
　a sideslip-angle estimator configured to estimate a sideslip angle in the vehicle that is traveling at the target rudder angle, on the basis of the target rudder angle and a vehicle condition of the vehicle; and
　an automatic steering controller that performs at least one of stopping of the automatic steering control and controlling of a steering-quantity regulation gain for regulating the target rudder angle, when the sideslip angle, estimated by the sideslip-angle estimator, is equal to or greater than a predetermined value.

2. The automatic steering control apparatus according to claim 1, wherein
　the target-path receiver repeatedly acquires the target path in a period during which the sideslip angle, estimated by the sideslip-angle estimator, is equal to or greater than the predetermined value,
　the automatic steering control apparatus further comprises a counter configured to count the number of times at which the target-path receiver acquires the target path, and
　the automatic steering controller selectively performs the stopping of the automatic steering control and the controlling of the steering-quantity regulation gain on the basis of the number of times, counted by the counter.

3. The automatic steering control apparatus according to claim 2, wherein the steering-quantity regulation gain when the number of times is equal to or greater than a predetermined value is smaller than the steering-quantity regulation gain when the number of times is less than the predetermined value.

4. The automatic steering control apparatus according to claim 2, wherein the target-path receiver acquires the target path on the basis of base information for acquiring the target path, in response to an update of the base information.

5. An automatic steering control method capable of automatic steering control where a steering quantity in a vehicle is automatically controlled, the automatic steering control method comprising:
　acquiring a target path that is to be a traveling path of the vehicle;
　acquiring a target rudder angle that is to be a rudder angle in the vehicle, on the basis of the target path;
　estimating a sideslip angle in the vehicle that is traveling at the target rudder angle, on the basis of the target rudder angle and a vehicle condition of the vehicle; and
　performing at least one of stopping of the automatic steering control and controlling of a steering-quantity regulation gain for regulating the target rudder angle, when the estimated sideslip angle is equal to or greater than a predetermined value.

6. An automatic steering control apparatus capable of automatic steering control where a steering quantity in a vehicle is automatically controlled, the automatic steering control apparatus comprising processing circuitry configured as:
　a target-path receiver configured to acquire a target path that is to be a traveling path of the vehicle;
　a target-rudder-angle receiver configured to acquire a target rudder angle that is to be a rudder angle in the vehicle, on the basis of the target path;
　a sideslip-angle estimator configured to estimate a sideslip angle in the vehicle that is traveling at the target rudder angle, on the basis of the target rudder angle and a vehicle condition of the vehicle; and
　an automatic steering controller that performs at least one of stopping of the automatic steering control and controlling of a steering-quantity regulation gain for regulating the target rudder angle, when the sideslip angle, estimated by the sideslip-angle estimator, is equal to or greater than a predetermined value.

* * * * *